United States Patent
Suess

(10) Patent No.: US 7,216,588 B2
(45) Date of Patent: May 15, 2007

(54) MODIFIED-QWERTY LETTER LAYOUT FOR RAPID DATA ENTRY

(76) Inventor: Dana Suess, 15725 W. 138th St., Homer Glen, IL (US) 60491

( * ) Notice: Subject to any disclaimer, the term of this patent is extended or adjusted under 35 U.S.C. 154(b) by 305 days.

(21) Appl. No.: 10/521,101

(22) PCT Filed: May 6, 2003

(86) PCT No.: PCT/US03/14239

§ 371 (c)(1), (2), (4) Date: Jan. 11, 2005

(87) PCT Pub. No.: WO2004/008404

PCT Pub. Date: Jan. 22, 2004

(65) Prior Publication Data
US 2005/0244208 A1    Nov. 3, 2005

Related U.S. Application Data

(60) Provisional application No. 60/395,440, filed on Jul. 12, 2002.

(51) Int. Cl.
*H04M 1/02*    (2006.01)
*B41J 5/10*    (2006.01)

(52) U.S. Cl. .................. 101/486; 101/489; 345/169; 341/22; 455/556.1

(58) Field of Classification Search ............ 400/486, 400/489, 472; 345/169, 168; 341/22; 455/556.1; 379/433.07, 433.06
See application file for complete search history.

(56) References Cited

U.S. PATENT DOCUMENTS 1,652,464 A * 12/1927 Tyberg ............... 400/489
4,615,629 A    10/1986 Power
4,999,795 A    3/1991 Lapeyre
5,067,103 A    11/1991 Lapeyre
RE34,304 E    7/1993 Goldwasser et al.
5,383,141 A    1/1995 Lapeyre
5,469,160 A    11/1995 Yang
5,487,616 A    1/1996 Ichbiah
5,584,588 A    12/1996 Harbaugh
5,626,428 A    5/1997 Miwa
5,626,429 A    5/1997 Choate
5,936,556 A    8/1999 Sakita (Continued)

FOREIGN PATENT DOCUMENTS

EP    0 126 542    11/1984

(Continued)

*Primary Examiner*—Leslie J. Evanisko
(74) *Attorney, Agent, or Firm*—Quarles & Brady LLP; Gavin J. Milczarek-Desai

(57) ABSTRACT

A data entry pad arrangement includes twenty-six letters of the Roman alphabet arranged in a matrix including six rows of three to six letters per row. Ideally, no two adjacent letters in a row of the matrix are in alphabetical order. A method for designing a data-entry interface layout including letters of the Roman alphabet thereon involves the transposition of the letters of the Roman alphabet on a three-row QWERTY keyboard into six rows, wherein a letter (optimally every other letter) within a first, second, or third row of said three-row QWERTY keyboard is placed in an additional row substantially below an adjacent letter of said first, second, or third row.

12 Claims, 6 Drawing Sheets

U.S. PATENT DOCUMENTS

| | | |
|---|---|---|
| 5,938,353 A | 8/1999 | Butler |
| 5,973,607 A | 10/1999 | Munyon |
| 5,995,024 A | 11/1999 | Kambayashi et al. |
| 6,009,338 A | 12/1999 | Iwata et al. |
| 6,047,196 A * | 4/2000 | Makela et al. ............ 455/556.1 |
| 6,050,825 A | 4/2000 | Nichol et al. |
| 6,104,385 A | 8/2000 | Hobbs |
| 6,198,474 B1 | 3/2001 | Roylance |
| 6,262,881 B1 | 7/2001 | Karidis |
| 6,297,752 B1 * | 10/2001 | Ni ............................... 341/22 |
| 6,392,870 B1 | 5/2002 | Miller, Jr. |
| 6,445,380 B1 | 9/2002 | Klein |
| 6,580,932 B1 * | 6/2003 | Finke-Anlauff ............. 455/566 |
| 6,933,926 B2 * | 8/2005 | Ukita et al. ................. 345/168 |
| 7,073,964 B2 * | 7/2006 | Griffin et al. ............... 400/486 |
| 2001/0013859 A1 | 8/2001 | Roylance |
| 2002/0034063 A1 | 3/2002 | Miller, Jr. |
| 2002/0118175 A1 * | 8/2002 | Liebenow et al. .......... 345/168 |
| 2005/0235021 A1 * | 10/2005 | Chen et al. .................. 708/142 |

FOREIGN PATENT DOCUMENTS

| | | |
|---|---|---|
| EP | 0 816 987 | 1/1998 |
| WO | WO 98/02312 | 1/1998 |
| WO | WO 99/06216 | 2/1999 |

* cited by examiner

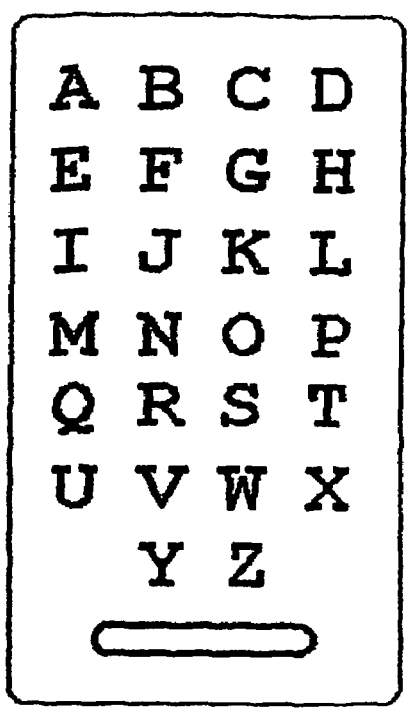
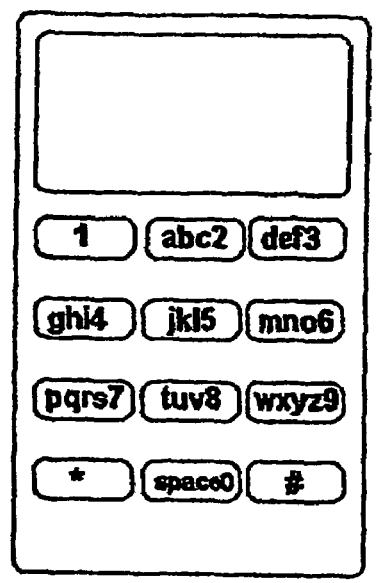
Fig. 5 (Prior Art)
Fig. 4 (Prior Art)
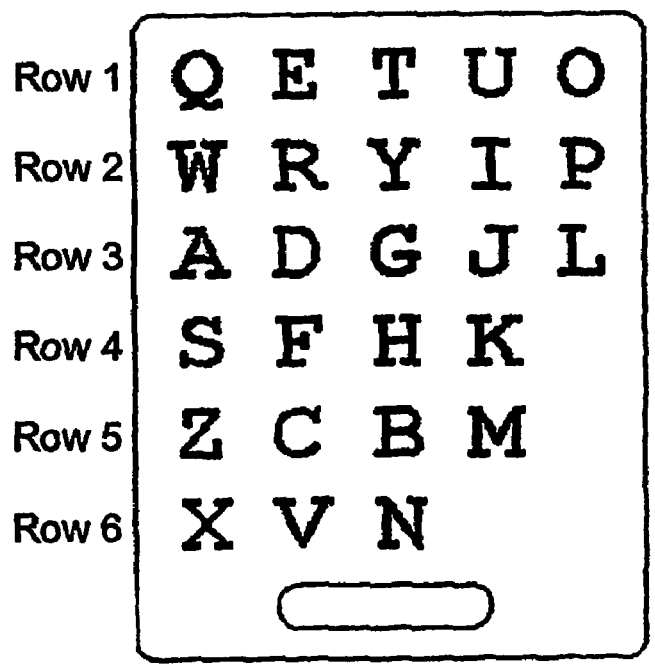
Fig. 6

Row 1   Q E T U O
Row 2   W R Y I P
Row 3   A D G J L
Row 4   S F H K ?
Row 5   X V N , .
Row 6   Z C B M Shift
Row 7   ← ▭ ←
Fig. 7
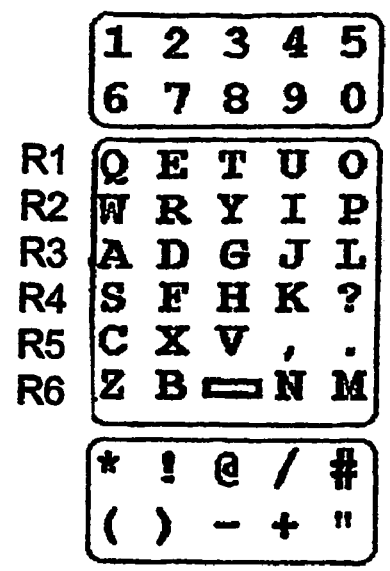
Fig. 8
R1 Q E T U O ←
R2 W R Y I P Del
R3 A D G J L ;
R4 S F H K : ←
R5 X V B " < >
R6 Z C N M ? .
Fig. 9
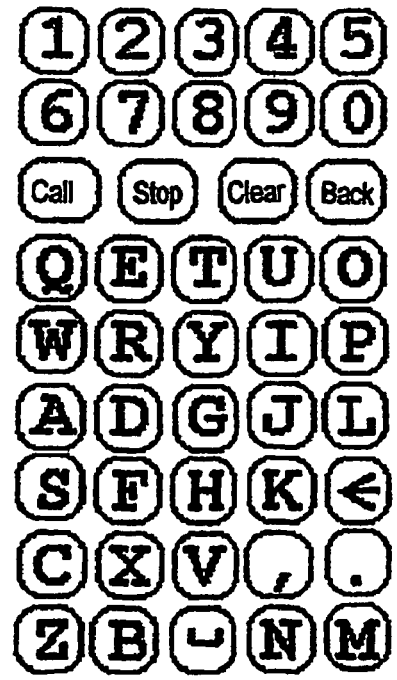
Fig. 10

MODIFIED-QWERTY LETTER LAYOUT FOR RAPID DATA ENTRY

CROSS-REFERENCE TO RELATED APPLICATIONS

This application is a 371 of PCT/US03/14239 filed May 6, 2003, which claims benefit of U.S. Provisional Application No. 60/395,440, filed on Jul. 12, 2002 by the same inventor.

BACKGROUND

1. Field of the Invention

The invention relates in general to the field of data entry interfaces, such as keyboards and the like, and more particularly to a modified QWERTY letter layout that is especially useful for the rapid entry of data into hand-held electronic devices (such as a cellular phone or personal digital assistant).

2. Description of the Related Art

The first typewriter worked with three or four rows of finger-tip size buttons called "keys." Each key could be depressed by the outstretched fingers of the hands of the typist as the entire layout of keys was designed to be approximately the width of two hands. From this simple beginning, the typewriter has given rise to a plethora of data entry interfaces based on the underlying concept of the tactile input of text-based information. Indeed, everyone who has used a typewriter or computer in the last ten years is familiar with data entry interfaces known simply as "keyboards", "keypads," or even "touch screens."

Keyboards and keypads are still the preferred means for entering information into devices such as hand-held electronic devices, computers, and cell phones. Normally, keyboards include the ability to enter numbers, alphabetic characters, punctuation, and control characters. At least for the English language (and others utilizing the 26 characters of the Roman alphabet), the ubiquitous "QWERTY" keyboard arrangement has become the de-facto standard layout of letter characters, numbers, and punctuation. An illustration of the standard QWERTY keyboard layout is shown in FIG. 1.

The QWERTY keyboard has three rows of letter keys and one row of number keys with approximately 12 keys per row. The top row of a QWERTY keyboard usually contains the numbers, along with various symbols and punctuation marks. The bottom three rows contain all of the letter characters and some additional punctuation marks. The 4 rows of keys with 12 keys per row cause the keyboard to be substantially wider than it is tall. Thus, the main problem with this keyboard design is that it is relatively large, making it unsuitable for hand-held portable devices and other applications where size and the dimensions of the data entry interface are constraints.

In other words, the traditional QWERTY layout does not work well in applications where it would be desirable to have a keyboard that is taller than it is wide, such as a cell phone keypad. In fact, previous QWERTY-type keyboards are either so large that they are difficult to manually operate with one hand (and add too much bulk to a small electronic item) or so small that the size of the keys are reduced to the point where the use of a "stylus" (a thin, often plastic "stick" used for pressing the buttons) becomes necessary to avoid mashing several keys at once with one's fingers.

While several inventions have attempted to modify the QWERTY layout of keys to suit a particular purpose, none are known to overcome all of the aforementioned problems. For example, U.S. Pat. No. 6,445,380 issued to Klien discloses a variation on a standard QWERTY layout, but retains the typical 3 row arrangement of letters. Similarly, U.S. Pat. No. 5,626,429 issued to Choate suggests the possibility of increasing the number of QWERTY keyboard rows to 4 or more, but with the requirement that there be at least nine "columns" or keys in a row. Other inventors, such as Ichbiah in U.S. Pat. No. 5,487,616, abandon the QWERTY layout altogether in favor of a keyboard arrangement based on the frequency of use for each character.

Recent experience has shown that when designers have attempted to design small keyboards that are taller than they are wide, they have typically abandoned the QWERTY layout and used character arrangements based upon alphabetic ordering. Examples of alphabetically ordered keyboards of the prior art are shown in FIGS. 2–4.

The main problem with these designs is that it takes users longer to visually acquire their desired target character on the keyboard because they must scan the alphabet until a letter is located. Especially for anyone who has been trained to type on a QWERTY keyboard, the visual acquisition process markedly slows down the rate of text input.

Similar alphabetically ordered layouts have been designed for cell phone keypads (see FIG. 5). The main problem with these layouts is that telephone keypads are primarily designed to enter the digits 0–9 and the characters # and *. The ability to enter the letters A–Z, punctuation and control characters has not been a priority, as demonstrated by the existence of keypads that make it particularly labor-intensive to enter text. For example, one common telephone keypad design (FIG. 5) requires the user to hit a particular key from 1 to 5 times to differentiate between (and thereby enter) just a single character or number.

Another keyboard design, known by the trademark FASTAP, is arranged much like as in FIG. 4. The main problem with this design is that it uses a substantially alphabetic ordering of letters A–Z (and the resultant slowing of data entry, especially with users who are familiar with a QWERTY keyboard layout). Another problem with this design is that by using only four characters per row, direct access to the alphabet and a limited number of non-alphabet characters must be squeezed into seven rows of buttons. Because of space constraints, other characters or punctuation marks must be "scrolled through" on the screen one at a time and selected.

In view of the above, it would be desirable to have a data entry interface that could be taller than wide, would fit within the dimensions of existing hand-held electronic devices, and allow for faster data entry than previous designs.

SUMMARY OF THE INVENTION

The invention relates in general to a data entry interface (e.g., a keyboard or keypad) featuring a novel six-rowed QWERTY-type layout of letters. More specifically, the invention provides in one embodiment a keyboard that is created by selecting a letter (preferably every other letter) of a traditional QWERTY keyboard and forming a new row of letters below the row from which the letters were selected. This selection process is then repeated for the remaining rows such that the traditional three-rowed QWERTY keyboard is transformed into a six-rowed keyboard of the invention. By placing each selected letter below the row from which it was selected, all letters are kept substantially in the same vicinity as they were in the original QWERTY layout. Accordingly, the six-rowed layout of the invention expedites the typing of text and other information on small keyboards, especially by users who are familiar with the standard QWERTY keyboard arrangement.

Preferably, the invention utilizes existing keyboard structures or keypad button configurations as are found on cellular telephones, personal digital assistants, and the like. However, other data entry structures, such as four-letter buttons, a "touch pad," or electronic display screen, are also contemplated by the inventor.

Thus, it is a primary objective of the invention to provide a data entry interface that utilizes a six-row QWERTY character layout rather than the traditional three-row layout.

Further, an object of the invention is to provide a modified QWERTY layout that facilitates the rapid entry of data on hand-held electronic devices.

Another object of the invention is to provide a keyboard or keypad layout that is adaptable for use with a wide variety electronic devices.

Still another object of the invention is to provide a keyboard or keypad that facilitates faster visual acquisition of desired characters then is presently available on small electronic devices.

Yet another object of the invention is to provide a data input interface that is familiar to users of the standard QWERTY character layout yet compact enough to fit on a variety of small electronic devices.

Still another object of the invention is to provide improved keypads or keyboards for small electronic devices that enhance the efficiency of data entry, thereby promoting the use of text entry and acquisition of data on these devices.

Yet another object of the invention is to provide a QWERTY-type keyboard or keypad that can be typed on by using a thumb of each hand more efficiently then keyboards or keypads found on existing hand-held devices.

Another object of the invention is to provide a keyboard or keypad that is taller than it is wide such that it can be held and typed on using one hand.

An additional object of the invention is to provide a keypad or keyboard that is easy to use on a hand-held electronic device yet economical to produce.

Another object of the invention is to provide a keypad or keyboard on a small electronic device that provides a means for actuating each character by using a single key stroke.

In accordance with these and other objects, there is provided a new and improved arrangement of letters for data entry interfaces that is especially useful for data entry on small or narrow electronic devices.

Various other purposes and advantages of the invention will become clear from its description in the specification that follows. Therefore, to the accomplishment of the objectives described above, this invention includes the features hereinafter fully described in the detailed description of the preferred embodiments, and particularly pointed out in the claims. However, such description discloses only some of the various ways in which the invention may be practiced.

BRIEF DESCRIPTION OF THE DRAWINGS

FIG. 4 is a schematic view of a third alphabetically ordered keyboard layout of the prior art.

FIG. 5 is a schematic view of an alphabetically ordered mobile-telephone keypad layout of the prior art.

FIG. 6 is a schematic view of a preferred embodiment of the invention.

FIG. 7 is a schematic view of a second embodiment of the invention.

FIG. 8 is a schematic view of a third embodiment of the invention.

FIG. 9 is a schematic view of a fourth embodiment of the invention.

FIG. 10 is a schematic view of an embodiment of the invention particularly suited for use on a mobile phone.

DETAILED DESCRIPTION OF THE PREFERRED EMBODIMENTS

The invention involves a data entry interface layout that positions the twenty-six letters of the Roman alphabet in a matrix preferably including six rows of three to six letters per row. Ideally, no two adjacent letters are in alphabetical order. Thus, the invention relates to a keyboard, keypad, or other form of data-input interface that substantially departs from the dimensions and layout of a standard QWERTY and alphabetically ordered keyboards.

The invention also relates to a method for designing a data entry interface layout by transposing the letters of the Roman alphabet as found on a standard three-row QWERTY keyboard into six rows such that a letter within a first, second, or third row of the standard QWERTY keyboard is selected and placed in an additional row substantially below an unselected letter of said first, second, or third row.

Figure 1:
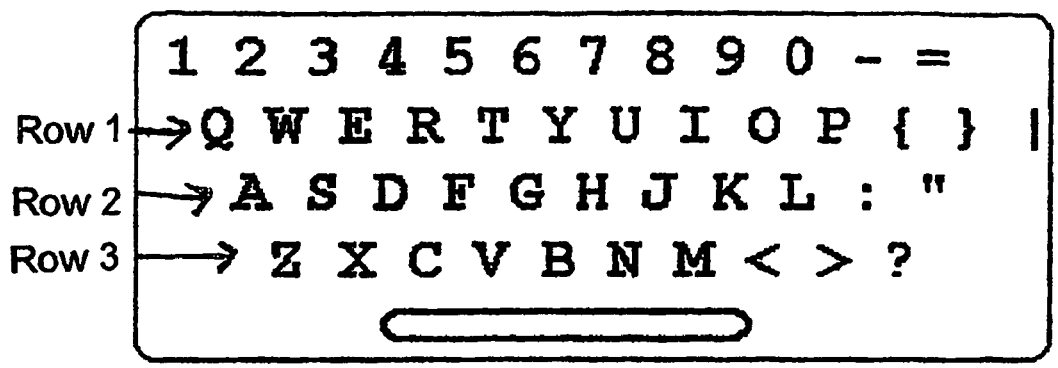
FIG. 1 is a schematic view of a standard QWERTY keyboard layout.
Figure 2:
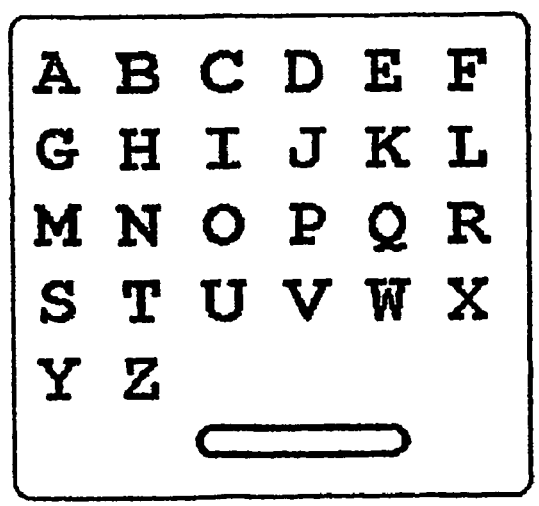
FIG. 2 is a schematic view of an alphabetically ordered keyboard layout of the prior art.

For example, a new keyboard is created by transforming the 3 rows of letters on a standard QWERTY keyboard (FIG. 1) into a six-row matrix containing between three to six letters per row as shown in FIG. 6. In this embodiment, the letter characters in these newly introduced rows (i.e., rows 2,4, and 6) are arranged by moving every other character from the original first, second, and third row of the standard QWERTY layout and combining those selected characters into another row of characters inserted below the original row. This process is repeated for the other two rows of letters in the standard QWERTY keyboard.

By placing each selected character substantially below its original location, the characters are kept in the same vicinity of where they were located in the standard QWERTY keyboard. Thus, the overall effect is that typing speed on hand-held devices increases because the general letter location is more familiar to users of the standard QWERTY layout. Moreover, due to the compactness of this design, many industries that are looking to augment use of text entry (e.g., text messaging on cellular phones) would embrace this "taller-than-wide" format because it both facilitates faster typing and fits well on small electronic devices.

As used throughout this application, the terms "small electronic device" or "hand-held device" are meant to broadly describe portable electronic devices that feature keyboards or keypads for data entry. Such devices may include, but are not limited to, hand-held computers, mobile telephones, remote control devices (e.g., for televisions or web-surfing interfaces), electronic address books or other databases (e.g., dictionaries or foreign word translators), personal digital assistants (PDA's), and pagers. Moreover, while the invention is particularly well suited for use with small electronic devices, it should be understood that it can be used with any device having a keyboard or keypad (e.g., a photocopier). Furthermore, the inventor contemplates use of the invention with electronic display screens, such as "touch pads" and the like. In this format, the novel modified QWERTY layout would be manifested electronically on a LCD or similar type of screen or viewer for the user to select characters by touch.

General Design and Advantages

An important purpose of the invention is to allow people to type faster on their cell phones and other small devices having space and dimensional constraints. Thus, the main components of the invention include 1) a modified QWERTY data-entry interface layout and 2) a method of designing a modified-QWERTY arrangement for small keyboards and the like.

Figure 3:
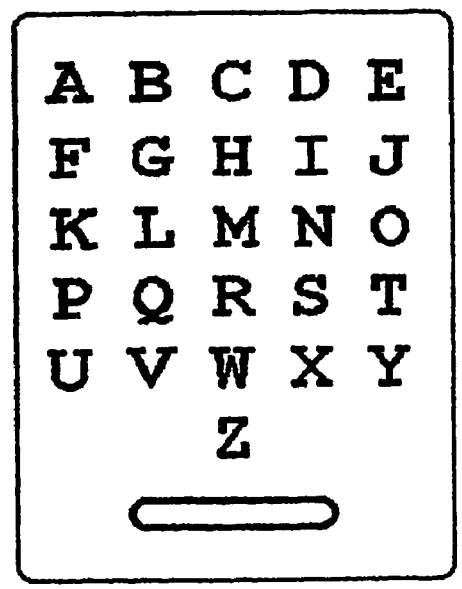
FIG. 3 is a schematic view of a second alphabetically ordered keyboard layout of the prior art.

Although the two keyboards in FIGS. 3 and 6 are substantially the same size and dimensions (5 columns by 6 rows), tests conducted by the inventor reveal that most users will type approximately twice as fast on the inventive keyboard (FIG. 6) as they will on the alphabetically ordered keyboard (FIG. 3). In addition, as farther described below, the average user will type approximately three times faster on the inventive keyboard of FIG. 6 than on a traditional cell phone keypad (FIG. 5). One reason for this result is that the new layout uses an innovative placement of characters to allow the user (and especially the user who is familiar with a standard QWERTY layout) to visually acquire the letters they wish to type faster than with previous designs.

Turning to FIG. 7, a schematic view of an embodiment of the invention featuring additional (non-letter) characters is shown. Row 7 contains a "space bar" flanked by two cursor-control "arrow keys," while rows 4, 5, and 6 feature punctuation marks and a shift key. Of course, the choice of (optional) non-letter characters is not limited to those shown in the figure.

FIG. 8 illustrates an embodiment having a separate number and expanded non-letter character areas. This embodiment also serves to illustrate the design method of the invention. The letters Q, W, E, R, T, Y, U, I, O, and P from the first row of the standard QWERTY keyboard (FIG. 1) are transposed by selecting characters from the original first row and moving them to form a new row (R2) below the remaining original characters (which stay in R1). Similarly, the letters S, F, H, and K from the second row of the standard QWERTY keyboard are transposed to form a new row (R4) below the remaining original characters of R3. Finally, the letters Z,B,N, and M from the third row of the standard QWERTY keyboard are transposed to form a new row (R6) below the remaining original characters of R5 in the new, inventive keyboard.

Preferably, every other letter (alternating letters) is repositioned according to the method of the invention. Of course, different "alternating" letters may be selected for repositioning in a new row. For example, the "following letter" on each row of the standard QWERTY layout may be selected and moved to a new row substantially below the unselected letters. Thus, the embodiment illustrated in FIG. 6 has the W (which follows Q), the R (which follows E), the Y (which follows T), the I (which follows U) and the P (which follows O) repositioned in row two. Similarly, a "preceding letter" may also repositioned such that, for example, Q would be moved under W, E would be moved under R, and so forth.

FIG. 9 further illustrates the method of the invention in that any letter in a given row of the standard QWERTY layout of letters may be selected for placement beneath any other letter in that row. Thus, R5 includes the letters XVB while R6 comprises ZCNM.

FIG. 10 is a schematic view of an embodiment of the invention particularly suited for use on a mobile phone. Here, a variety of function keys may be included to facilitate the typing of text messages on a mobile (e.g., cellular) phone.

Visual Acquisition

An important advantage of this invention is that it expedites physically locating and pressing the desired letter because each letter is physically near where the finger or thumb would normally head toward on a standard QWERTY layout and because motor memory tends to propel the finger or thumb to the relative location. For example, in the embodiment illustrated in FIG. 6, the letter "W" has been moved from its original (standard QWERTY) location to just below the letter "Q." This is a little to the left and below where it is expected to be but still, generally speaking, the new letter location is in the upper third of the six rows and is toward the left side of the keyboard where it is easily located and pressed.

Figure 11:
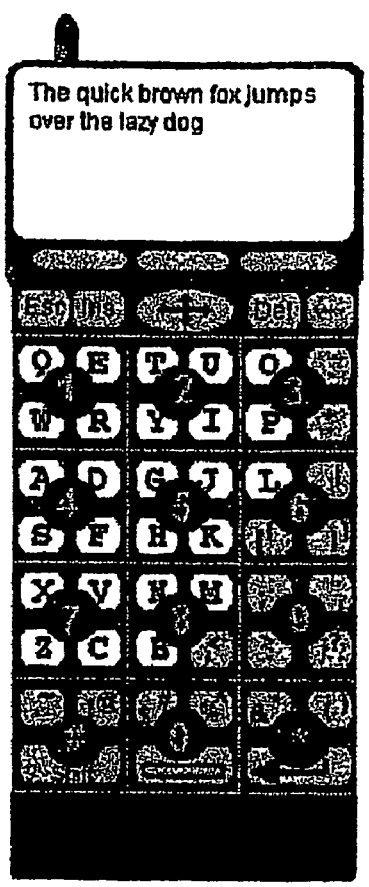
FIG. 11 is a schematic view of a preferred embodiment of the invention particularly suited for use on a mobile phone.
Figure 12:
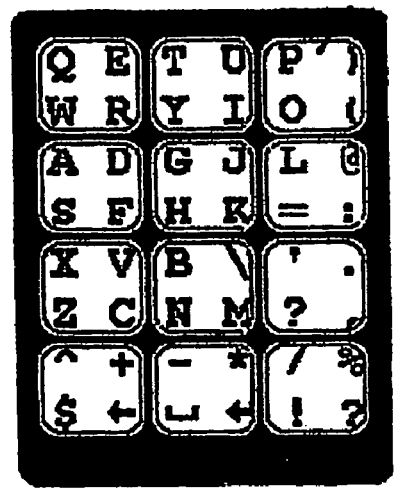
FIG. 12 is a schematic view of an embodiment of the invention that features a plurality of characters disposed upon a single button.
Figure 13:
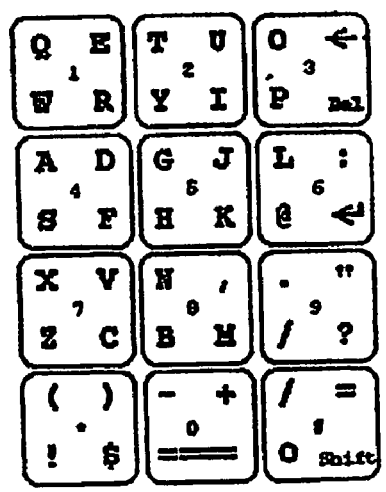
FIG. 13 is a schematic view of a second embodiment of the invention that features a plurality of characters disposed upon a single button.
Figure 14:
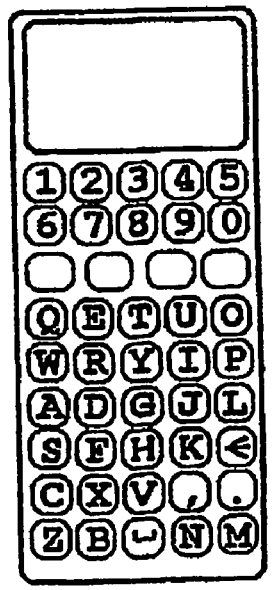
FIG. 14 is a schematic view of an embodiment of the invention designed for a personal digital assistant (PDA).
Figure 15:
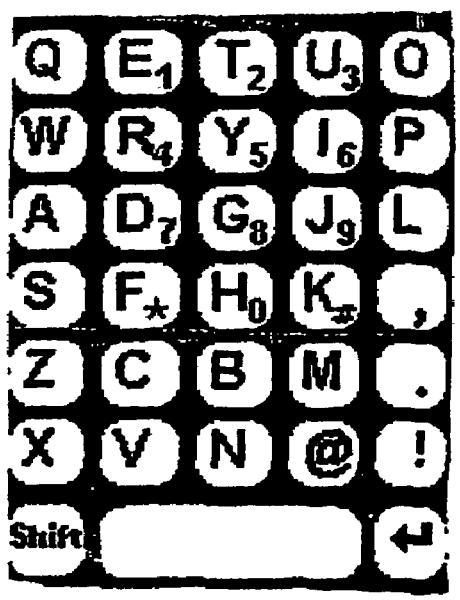
FIG. 15 is a schematic view of a preferred layout designed for a mobile phone.

Thus, this method of design results in a keyboard that is now not only taller than it is wide, but also facilitates rapid typing by its layout of characters. The concept of selecting letters in a given row of the standard QWERTY arrangement and repositioning them substantially below the remaining (unselected) letters is extended as much as possible to the placement of punctuation and control characters as seen in FIG. 11, keeping these characters physically close to where they existed on the standard QWERTY keyboard.

General Operation

Using a traditional one-button-per-character implementation of the invention (e.g., FIG. 10), users simply see the button they want and press it with their fingertip, thumb or stylus. Shifted characters are selected in the typical way (i.e., pressing the "Shift" key on a keyboard followed by the desired character). To facilitate one-handed operation, the user can press and release the shift key to capitalize the next letter entered or push and hold the shift key to enter multiple capitalized characters.

The invention is also well suited for use in a variety of speciality applications. For example, when entering "vanity" numbers on a cell phone, the user may simply enter the letters on the keyboard. Presently available cell phone software could then map the letter to the corresponding telephone number. For example, if the user (while in dialing mode) enters1800PATENTS, the letter "P" is automatically converted to a "7," the letter "A" is converted to a "2" and so on.

Variations

Of course, many variations embodying the "row-splitting design" of the invention can be envisioned, such as those illustrated in FIGS. 12–15. While these examples demonstrate different character arrangements and/or disposing one or more characters on a single key or button, they all involve a method of splitting the 3 rows of alphabetic characters found on the standard QWERTY keyboard into 6 rows, while substantially keeping all characters in the general vicinity of where they existed on the standard QWERTY keyboard. Moreover, these examples further illustrate the great variety of non-alphabetic characters or function keys that can be added to the layout of the invention.

As would be readily apparent to one skilled in the art, minor variations in character location or presentation (e.g., lower case and/or uppercase, color, etc.) can be utilized without effecting the objects or advantages of the invention. For example, the location of letters may be physically "staggered" as follows:

```
        Q E T U O
         W R Y I P
        A D G J L
         S F H K
        Z C B M
         X V N
           or
        Q E T U O
         W R Y I P
          A D G J L
           S F H K
            Z C B M
             X V N
```

Modified-QWERTY Layout Testing

Figure 16A:
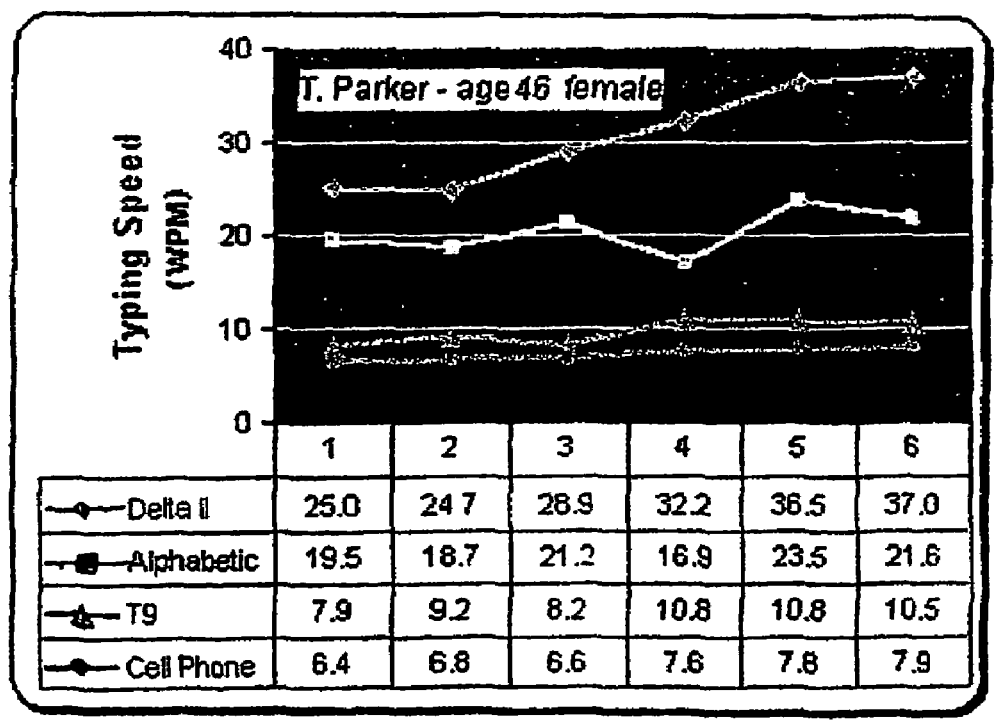
FIGS. 16a–c illustrate data from three independent time trials in which the speed of typing was measured for each of four different cell phone keypads.
Figure 16B:
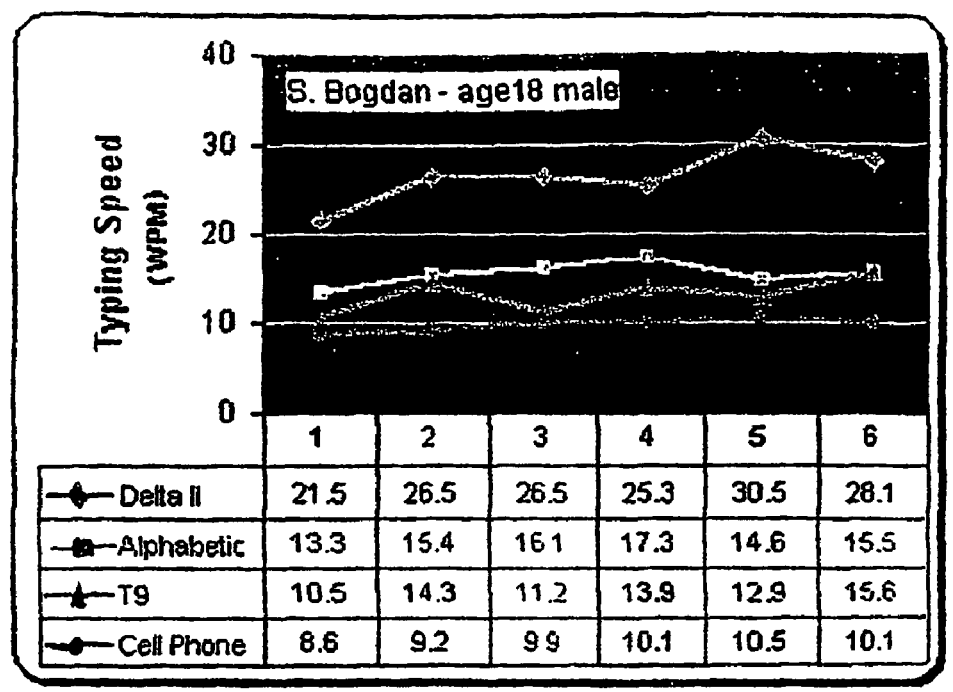
Figure 16C:
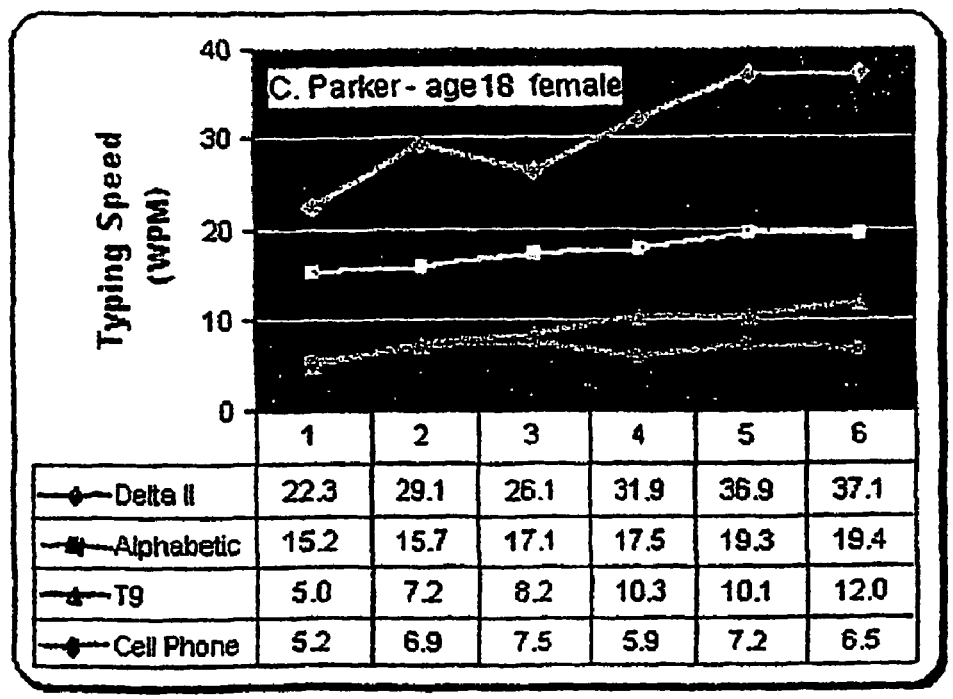

The graphs illustrated in FIGS. 16a–16 *c* compare the amount of time it takes three different typists to enter the sentence "The quick brown fox jumps over the lazy dog" on four different cell phone keypads. The test layouts included: (1) a standard cell phone keypad (e.g., FIG. 5) using a "multi-tap" program that allows a user to select a character from the group shown on each button; (2) a standard cell phone keypad featuring "T9" TM enhancement (a predictive text input program that can save keystrokes by finishing a "predicted" word); (3) an alphabetically ordered keypad of the type shown in FIG. 4; and (4) the preferred arrangement of the invention (FIG. 6 and referred to in the tests as the DELTA II keypad).

The sentence was typed six times on each of the four keypad types hence, the six columns of data under each graph). The times (in seconds) were then converted to words per minute (wpm) and graphed. The test subjects self-identified as "average typists," with two of the subjects having little or no experience entering text on a cell phone using any of the tested layouts and one subject (S. Bogdan) who had experience only with the standard cell phone layout featuring multi-tap.

As indicated by the graphs, each subject repeatedly entered text faster on the DELTA II keypad than on any other. These results are typical and consistent with those of other users who have been tested. The graphs also reveal an interesting trend in that users not only start out typing faster on the DELTA II keypad, but their typing speed also improves within just a few sentences of practice.

Various changes in the details and components that have been described may be made by those skilled in the art within the principles and scope of the invention herein described in the specification and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. A data entry interface arrangement including all twenty-six letters of a top, middle, and bottom row of a standard three-row QWERTY keyboard, comprising:
    a non-staggered, linearly aligned six-row matrix consisting of a first set of two rows, a second set of two rows, and a third set of two rows, wherein said first set only consists of all letters in the top row of the QWERTY keyboard, said second set only consists of all letters in the middle row of the QWERTY keyboard, and said third set only consists of all letters in the bottom row of the QWERTY keyboard.

2. The data entry interface arrangement of claim 1, wherein said non-staggered, linearly aligned six-row matrix includes between three and six letters per row.

3. The data entry interface arrangement of claim 1, wherein said non-staggered, linearly aligned six-row matrix language:
    QETUO
    WRYIP
    ADGJL
    SFHK
    ZCBM
    XVN.

4. The data entry arrangement of claim 1, wherein each letter in each row is spaced equally from an adjacent letter.

5. The data entry interface arrangement of claim 1, wherein said non-staggered, linearly aligned six-row matrix is manifested electronically upon a touch screen.

6. The data entry interface arrangement of claim 1, wherein said non-staggered, linearly aligned six-row matrix is disposed upon a plurality of keys or buttons.

7. A mobile telephone for efficient entry of data, comprising:
    a mobile telephone; and
    a data input area including all twenty-six letters of a top, middle, and bottom row of a standard three-row QWERTY keyboard disposed upon said mobile telephone,
    wherein said data input area further comprises a non-staggered, linearly aligned six-row matrix consisting of a first set of two rows, a second set of two rows, and third set of two rows, with said first set only consisting of all letters in the top row of the QWERTY keyboard, said second set only consisting of all letters in the middle row of the QWERTY keyboard, and said third set only consisting of all letters in the bottom row of the QWERTY keyboard.

8. The mobile telephone of claim 7, wherein said non-staggered, linearly aligned six-row matrix includes between three and six letters per row.

9. The mobile telephone of claim 7, wherein said non-staggered, linearly aligned six-row matrix is arranged in the following manner.
    QETUO
    WRYIP
    ADGJL
    SFHK
    ZCBM
    XVN.

10. The mobile telephone of claim 7, wherein each letter in each row is spaced equally from an adjacent letter.

11. The mobile telephone of claim 7, wherein said non-staggered, linearly aligned six-row matrix is manifested electronically upon a touch screen.

12. The mobile telephone of claim 7, wherein said non-staggered, linearly aligned six-row matrix is disposed upon a plurality of keys or buttons.

* * * * *

UNITED STATES PATENT AND TRADEMARK OFFICE
CERTIFICATE OF CORRECTION

| | | |
|---|---|---|
| PATENT NO. | : 7,216,588 B2 | Page 1 of 1 |
| APPLICATION NO. | : 10/521101 | |
| DATED | : May 15, 2007 | |
| INVENTOR(S) | : Dana Suess | |

It is certified that error appears in the above-identified patent and that said Letters Patent is hereby corrected as shown below:

Col. 8, Claim 3, line 3; delete "language" and insert -- is arranged in the following manner --

Signed and Sealed this

Seventh Day of August, 2007

JON W. DUDAS
*Director of the United States Patent and Trademark Office*